US011672004B2

(12) United States Patent
Shetty et al.

(10) Patent No.: US 11,672,004 B2
(45) Date of Patent: *Jun. 6, 2023

(54) METHODS FOR DYNAMICALLY OPTIMIZING A FLYING AD-HOC NETWORK

(71) Applicant: VMware, Inc., Palo Alto, CA (US)

(72) Inventors: Rohit Pradeep Shetty, Bangalore (IN); Suman Aluvala, Bangalore (IN); Ramani Panchapakesan, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/397,335

(22) Filed: Aug. 9, 2021

(65) Prior Publication Data

US 2022/0110002 A1  Apr. 7, 2022

Related U.S. Application Data

(63) Continuation of application No. 16/907,324, filed on Jun. 22, 2020, now Pat. No. 11,089,606.

(30) Foreign Application Priority Data

May 7, 2020 (IN) .............................. 202041019436

(51) Int. Cl.
 *H04W 72/00* (2023.01)
 *H04W 84/18* (2009.01)
 *H04W 72/56* (2023.01)
 *H04W 24/08* (2009.01)
 *H04B 7/185* (2006.01)
(Continued)

(52) U.S. Cl.
CPC ........ *H04W 72/56* (2023.01); *H04B 7/18502* (2013.01); *H04W 16/18* (2013.01); *H04W 24/08* (2013.01); *H04W 84/005* (2013.01); *H04W 84/18* (2013.01)

(58) Field of Classification Search
CPC ..... H04W 72/10; H04W 16/18; H04W 24/08; H04W 84/005; H04W 84/18; H04W 24/02; H04W 84/06; H04W 28/021; H04W 72/1247; H04B 7/18502
See application file for complete search history.

(56) References Cited

U.S. PATENT DOCUMENTS

7,991,899 B2   8/2011  Schmidt
10,264,407 B2  4/2019  Hu
(Continued)

*Primary Examiner* — Andrew Wendell
(74) *Attorney, Agent, or Firm* — Clayton, McKay & Bailey, PC (57) ABSTRACT

Described herein are methods and systems for dynamically optimizing a Flying Ad-Hoc Network ("FANET"). A server that manages the FANET can receive information relating to the network activity of user devices connected to the FANET. Examples of the type of information included can include the user devices' locations, network connection quality, and network traffic volume dedicated to a Unified Endpoint Management ("UEM") system of an enterprise. The server can analyze the network activity information based on a set of rules to prioritize the user devices connected to the FANET. The server can instruct unmanned aerial vehicles ("UAVs") in the FANET to reposition themselves to provide the best connection for higher priority user devices.

20 Claims, 5 Drawing Sheets

(51) Int. Cl.
*H04W 16/18* (2009.01)
*H04W 84/00* (2009.01)

(56) References Cited

U.S. PATENT DOCUMENTS

| | | |
|---|---|---|
| 11,089,606 B1 * | 8/2021 | Shetty .................. H04W 16/18 |
| 2017/0126309 A1 | 5/2017 | Rupasinghe |
| 2017/0220037 A1 | 8/2017 | Berestov |
| 2019/0166067 A1 | 5/2019 | Xu |
| 2019/0394695 A1 | 12/2019 | Mueck |
| 2020/0043348 A1 | 2/2020 | Ghosh |
| 2020/0107332 A1 | 4/2020 | Huang |
| 2020/0266903 A1 | 8/2020 | De Rosa |
| 2020/0351260 A1 | 11/2020 | White |

* cited by examiner

METHODS FOR DYNAMICALLY OPTIMIZING A FLYING AD-HOC NETWORK

RELATED APPLICATIONS

This application claims priority as a continuation of U.S. application Ser. No. 16/907,324, titled "METHODS FOR DYNAMICALLY OPTIMIZING A FLYING AD-HOC NETWORK," filed Jun. 22, 2020, which claims benefit under 35 U.S.C. 119(a)-(d) to Foreign application Serial No. 202041019436, filed in India, entitled "METHODS FOR DYNAMICALLY OPTIMIZING A FLYING AD-HOC NETWORK", on May 7, 2020, by VMware, Inc., both of which are herein incorporated by reference for all purposes.

BACKGROUND

Telecommunications providers are constantly seeking for new ways to expand their network coverage. However, such expansion typically requires running network cables and building new network nodes, such as base stations and WIFI points, which is time consuming and expensive. Consequently, decisions must frequently be made weighing the costs versus the benefits of providing coverage in certain areas. For example, a network provider may decide not to invest in installing the necessary network infrastructure in certain remote areas because it would be extremely expensive and only benefit a few individuals. Furthermore, the need for network coverage in such remote areas may only be temporary. For these reasons, some network providers have begun utilizing Flying Ad-Hoc Networks ("FANET") that include a system of unmanned aerial vehicles ("UAV") that act as range extenders.

However, FANETs are often difficult to configure and cannot adapt based on network needs. Rather, they simply provide general coverage in a certain geographical area. This often results in UAVs being positioned in areas with no user devices while other UAVs can get overloaded with network traffic. Furthermore, FANETs currently do not have a way to prioritize certain kinds of traffic over others. For example, where an enterprise organization implements a FANET, it has no way to differentiate between enterprise-related traffic and other traffic. This can cause a delays and limited access to the enterprise resources. In general, it is difficult for enterprises to ensure connectivity for workers in rural areas. Users may need to retain access to enterprise resources while moving about on a large property, such as a farm.

As a result, a need exists for a FANET that can be dynamically optimized by repositioning UAVs according to network demands.

SUMMARY

Examples described herein include systems and methods for dynamically optimizing a FANET. In an example, a server can receive network activity information relating to user devices connected to the FANET. The server can analyze the network activity information based on a set of rules to prioritize the user devices. The server can instruct at least one UAV to reposition itself to provide the best available connection for higher priority user devices.

The network activity information can include the user devices' locations, network connection quality, and network traffic volume dedicated to enterprise-related activities, for example. In an example, the network activity information can be gathered by a management application installed on the user devices. The management application can be part of an enterprise Unified Endpoint Management ("UEM") system that manages and secures user devices that are enrolled with the enterprise, for example. Examples of enterprise-related activities can include activities utilizing the UEM system, such as UEM applications installed on the user device.

Various rules can be used to prioritize the user devices. For example, one rule can give priority to user devices belonging to priority users. A second rule can give priority to user devices executing tasks that have been designated as priority tasks. The priority task designation can be set by an administrator, for example. A third rule can give priority to user devices utilizing the most network traffic dedicated to UEM-related activities.

In some examples, the priority rules can have a hierarchy. For example, user devices belonging to high priority users can receive the highest priority regardless of the tasks performed or UEM network traffic used by other user devices. In another example, user devices performing a priority task can be granted priority over other user devices despite the other user devices utilizing more UEM network traffic.

The server can group user devices together when applying the priority rules in some examples. For example, where two user devices are located near each other they may be able to connect to the same UAV. In such examples, server can combine the network activity information of those user devices for purposes of optimizing the FANET. As an example, a first user device may be using more UEM network traffic than two other user devices. However, the two other user devices are located near each other and can connect to the same UAV, and the combined UEM network traffic used by the other two devices is greater than the first user device. In such an instance, the server can prioritize the other two devices over the first device.

In some examples, the server can reposition a UAV based on a calendar event or scheduled task. For example, the server can have access to the calendar or schedule of tasks of the user devices connected to the FANET. Where a user device has a scheduled meeting or a priority task, as a few examples, the server can reposition a UAV near the user device for the duration of the scheduled task or meeting.

In some examples, the server can send instructions to reposition UAVs for reasons unrelated to user device priorities. For example, where a first UAV reports a low battery level, the server can deploy a second UAV to the location of the first. The two UAVs can hand off user device connections so that the first UAV can return to a charging station.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Described herein are methods and systems for dynamically optimizing a FANET according to network demands. A server can receive information relating to the network activity of user devices connected to a FANET. The server can analyze the network activity information based on a set of rules to prioritize the user devices. The server can instruct UAVs in the FANET to reposition themselves to optimize the FANET, wherein the network connections of higher priority user devices are prioritized over others.

Figure 1:
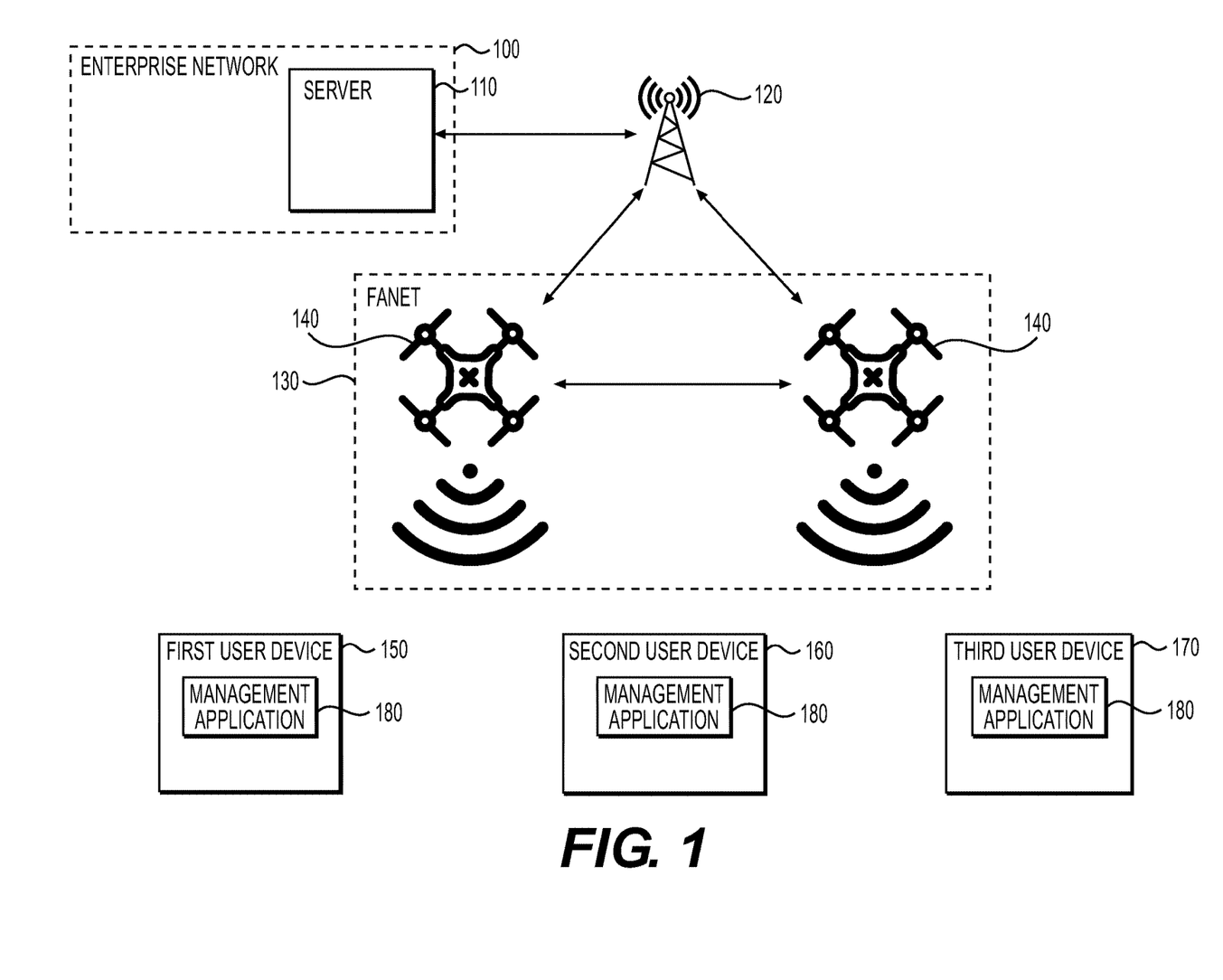
FIG. 1 is an illustration of a system for dynamically optimizing a FANET.

FIG. 1 is an illustration of a system for dynamically optimizing a FANET. The system can include a server 110, a base station 120, FANET 130 that includes UAVs 140, and user devices, such as first user device 150, second user device 160, and third user device 170. Enterprise network 100 can be a collection of network components, servers, applications, and other resources that are part of an enterprise organization. In an example, enterprise network 100 can utilize UEM tools to manage and secure all servers and user devices within or with access to enterprise network 100.

Server 110 can be a server within enterprise network 100. Server 110 can be single server or a group of servers, including multiple servers implemented virtually across multiple computing platforms. In an example, server 110 can be an edge server that provides an entry point into enterprise network 100 for devices located outside the physical area of enterprise network 100. Server 110 can thereby allow user devices outside enterprise network 100 to access enterprise network 100 and the resources within its UEM system.

To allow access to such user devices, server 110 can connect to base station 120. Base station 120 can be a fixed point of communication in a wireless telecommunications network. Base station 120 can be connected to server 110 directly or indirectly through other network components, and it can include an antenna for wirelessly transmitting and receiving signals to user devices, such as user devices 150, 160, and 170. Authorized user devices that connect to base station 120 can thereby connect to server 110 access UEM resources.

In some instances, some user devices may be located outside antenna range of base station 120. In these instances, a FANET 130 can be implemented to extend the range of base station 120. FANET 130 can utilize UAVs, such as UAVs 140, that act as another layer in connecting user devices to a network. UAVs 140 can include an antenna for transmitting and receiving signals to base station 120 and another antenna for user devices 150, 160, and 170. In a FANET, UAVs can be dynamically re-positioned according to network needs, such as user device locations and the network traffic loads of the user devices.

In some examples, base station 120 can be configured to communicate using mobile communications standard like 4G, 4G LTE, or 5G. In such examples, UAVs 140 can include a Subscriber Identity Module ("SIM") card that authorizes UAVs 140 and allows them to communicate with base station 120. In other examples, base station 120 can communicate with UAVs 140 using WIFI, such as 802.11n or 802.11g. In these examples, UAVs 140 may function has mobile WIFI extenders for base station 120. In some examples, UAVs 140 can communicate with user devices 150, 160, and 170 using the same standard used to communicate with base station 120. However, the communication protocol used between UAVs 140 and user devices 150, 160, and 170 can also be independent of the protocol use between UAVs 140 and base station 120. As an example, base station 120 can communicate with UAVs 140 using a mobile communications standard, but UAVs 140 can communicate with the user devices using WIFI.

Any number of UAVs 140 can be used in the FANET 130. For example, the FANET 130 can include fifty to one-hundred UAVs 140. The server 110 can adjust the number of active UAVs 140 based on user device demands on the FANET 130. Inactive UAVs 140 can park on a charger and await redeployment.

User devices 150, 160, and 170 can be one or more processor-based devices, such as a personal computer, tablet, or cell phone. Each of user devices 150, 160, and 170 can have a management application 180 installed thereon. The management application 180 can be a stand-alone application, part of an enterprise application, or part of an operating system of the user device 150, 160, 170. Management application 180 can be part of an enterprise UEM system that manages and secures user devices that are enrolled with the enterprise. For example, management application 180 can be responsible for ensuring that user devices are up to date with compliance and security settings prior to accessing UEM resources. The management application 180 can communicate with the server 110, allowing UEM management of user devices 150, 160, 170 based on compliance and security settings at the server 110. The management application 180 can enforce compliance at the user device 150, 160, 170, such as by wiping enterprise data when compliance standards are not met. Example compliance standards can include ensuring a device is not jailbroken, that particular encryption standards are used in enterprise data transmission, that the device does not have certain blacklisted applications installed or running, and that the device is located within a geofenced area when accessing certain enterprise resources.

In some examples, management application 180 can gather network activity information related to the user device on which it is installed, such as the user device's location, quality of the network connection, and the volume and type of UEM-related traffic. Management application 180 can instruct the user device to send this network activity information to base station 120. In some examples, base station 120 can be configured to analyze the network activity information from user devices, and in other examples base station 120 can forward this information to server 110 for analysis. Server 110 and base station 120 can also be configured to instruct UAVs 140 to reposition themselves. These instructions can be based on the performed analysis. The network activity information, analysis, and repositioning of UAVs is described in further detail below.

Figure 2:
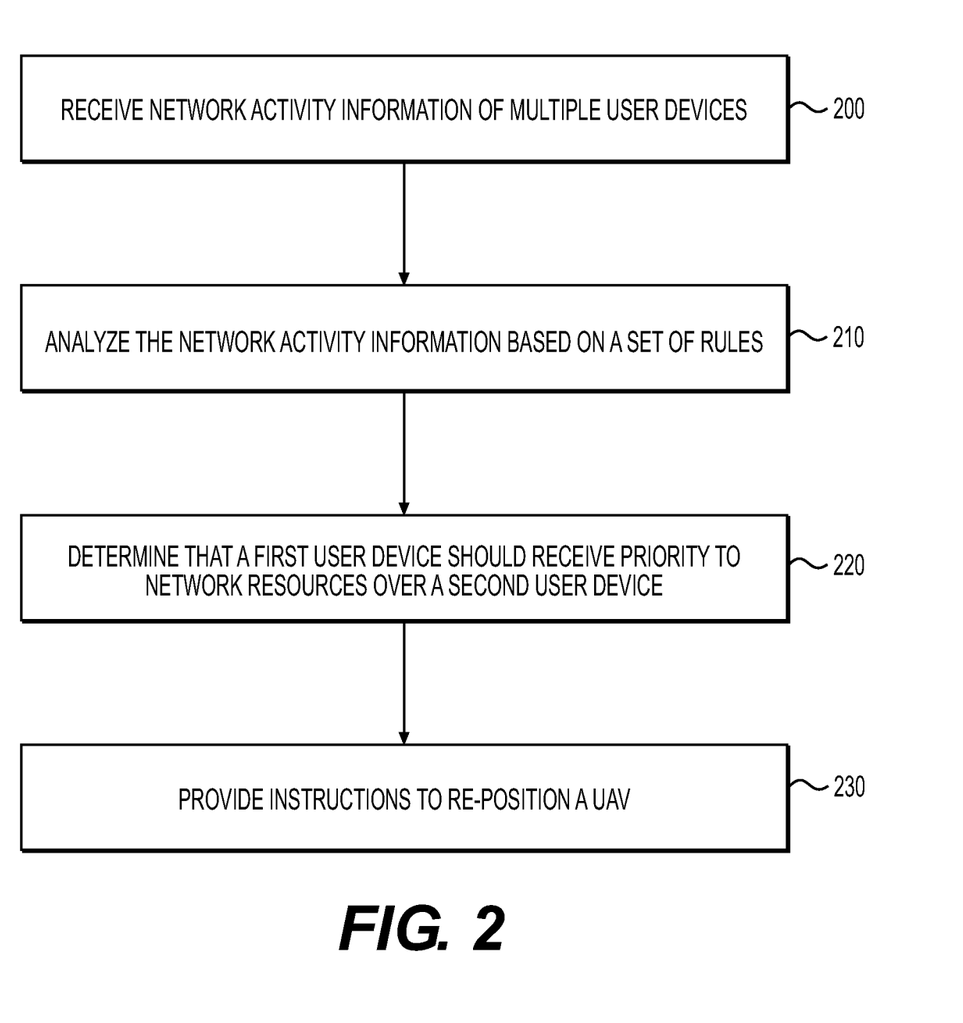
FIG. 2 is a flowchart of an example method for dynamically optimizing a FANET.

FIG. 2 is a flowchart of an example method for dynamically optimizing a FANET. At stage 200, server 110 can receive network activity information of multiple user devices, such as user devices 150, 160, and 170. The network activity information can be sent to the server 110 from the management application 180, in an example. As described previously, some examples of network activity information can include a user device's location, quality of the network connection, and the volume and type of UEM-related traffic. In an example, the types of network activity collected can be set by an administrator. In another example, the network activity information can be gathered by the management application 180 installed on the user devices. Management application 180 can regularly send the network activity information to server 110. In some examples, the network activity information can be received by base station 120. Although numerous method steps are described herein as being performed by server 110, it is contemplated that many of these steps can be performed by base station 120 or another similar network device.

In an example, management application 180 on first user device 150 gathers various network related information on first user device 150. For example, first user device 150 can include a geographic information system ("GIS") that reports the position of first user device 150, which can be included as part of the network activity information. The network activity information can also include network quality information of first user device 150, such as signal strength and packet loss rate. The network activity information can also include the amount of network traffic used by first user device 150 for UEM-related activities. For example, management application 180 can record network traffic information for UEM applications that it manages. Management application 180 continuously or regularly gathers this information and transmits it to server 110.

At stage 210, server 110 can analyze the network activity information based on a set of rules. These rules can be designed to prioritize network stability and efficient network resource allocation of a FANET and the users' access to UEM resources. One example rule can prioritize network resources for certain users. For example, a rule can give priority to corporate officers and IT personnel in an enterprise organization. The rule can be organized based on groups that distinguish different roles or departments within the enterprise organization. The user priorities rule can have their own hierarchy in some examples. For example, if first user device 150 belongs to a corporate officer device, second user device 160 belongs to an IT employee, and third user device 170 does not belong to a priority user, then first user device 150 can receive priority over second user device 160 and third user device 170, and second user device 160 can receive priority over just third user device 170.

A second example rule can give priority to certain tasks. For example, if first user device 150 is performing a task that has been designated a priority task but second user device 160 is not, then first user device 150 can receive priority over second user device 160. Like the user priority example above, the tasks can also have a hierarchized structure with multiple levels of priority.

A third example rule can give priority based on a network traffic volume. For example, when first user device 150 is utilizing a greater amount of network traffic volume than second user device 160, first user device 150 can receive priority over second user device 160. A network traffic rule can also differentiate between UEM and non-UEM traffic. UEM traffic can be, as an example, network traffic dedicated to UEM activities, such as network requests originating from applications managed by management application 180. Under this rule, a user device can receive priority despite using less overall network traffic than another device. For example, where second user device 160 is utilizing more overall network traffic than first user device 150, first user device 150 may still receive priority if first user device 150 is utilizing a higher volume of traffic dedicated to UEM-activities.

At stage 220, server 110 can determine that first user device 150 should receive priority to network resources over second user device 160. This determination can be based on the analysis performed at stage 210, for example. The rules for the priority determination can have a hierarchal structure. For example, the rules can have rankings relative to each other, and the rankings can determine when certain rules apply. As an example, server 110 can analyze network activity information using the three rule types previously described: the priority user rule, the priority task rule, and the UEM network traffic rule. In this example, the three rules are ranked 1, 2, and 3 respectively with 1 being the highest and 3 being the lowest. In an instance where first user device 150 belongs to a priority user but second user device 160 and third user device 170 do not, first user device 150 can receive priority regardless of the tasks or network traffic of the other two user devices. In an instance where none of the three user devices belong to a priority user, but first user device 150 is executing a priority task but the other two devices are not, first user device 150 can again receive priority. In an instance where none of the three devices belongs to a priority user or is performing a priority task, the user device utilizing the highest amount of UEM network traffic can receive priority.

In some examples, server 110 can combine two devices when determining priority. As an example, first user device 150 may be in one location and second user device 160 and third user device 170 can be located near each other in another location. Because second user device 160 and third user device 170 are located near each other, server 110 can position a single UAV 140 for both user devices. In this example, first user device 150 can utilize more UEM network traffic than either second user device 160 or third user device 170. However, the combined UEM network traffic volume of second user device 160 and third user device 170 can still be greater than first user device 150. In an instance where the second user device 160 and third user device 170 are located near each other and have a combined UEM network traffic volume higher than first user device 150, server 110 can group second user device 160 and third user device 170 together and give them priority over first user device 150.

At stage 230, server 110 can provide instructions to reposition a UAV. The instructions can be sent to one or multiple UAVs 140 in FANET 130. The instructions can be based on the priority determination from stage 220. For example, after determining that first user device 150 should receive priority to network resources, server 110 can send instructions to at least one UAV 140 to move to a location near first user device 150 to ensure that first user device 150 has a strong connection to UAV 140 and consequently to enterprise network 100. In an example where second user device 160 has a lower priority than first user device 150, but a higher priority than third user device 170, server 110 can instruct at least one UAV 140 to reposition itself to prioritize first user device's 150 signal quality overall the other two devices, and to also prioritize the signal quality of second user device 160 over third user device 170.

In some examples, server 110 can provide instructions to UAV 140 to follow a high priority user device. For example, a rule can provide that certain user devices, such as user devices of certain users or user device performing tasks, are designated for a follow-me protocol. Under a follow-me protocol, server 110 instructs a UAV 140 to follow the designated user device. For example, UAV 140 can use the designated user device's location data, such as its GIS data, to automatically reposition itself when the designated user device's location changes. In an example, UAV 140 can continue to follow the designated user device until it receives instructions from server 110 to stop the follow-me protocol.

In some examples, factors unrelated to device priority can cause server 110 to send relocation instructions. For example, UAVs 140 can report their battery levels to server 110, and when the battery level of one UAV 140 drops below a threshold, server 110 can cause a second UAV 140 to be deployed to replace the first one. In some examples, the battery threshold can depend on a UAV's distance from a charging station. In examples where one UAV is replacing another, the UAV's can communicate with each other to hand off any user device's active connection from the departing UAV to the incoming UAV.

In one example, the UAV position is moved closer to a charger based on the UAV's battery level. This can allow the UAV to remain in the sky and provide network connectivity longer while avoiding failures due to rapid battery loss.

Figure 3:
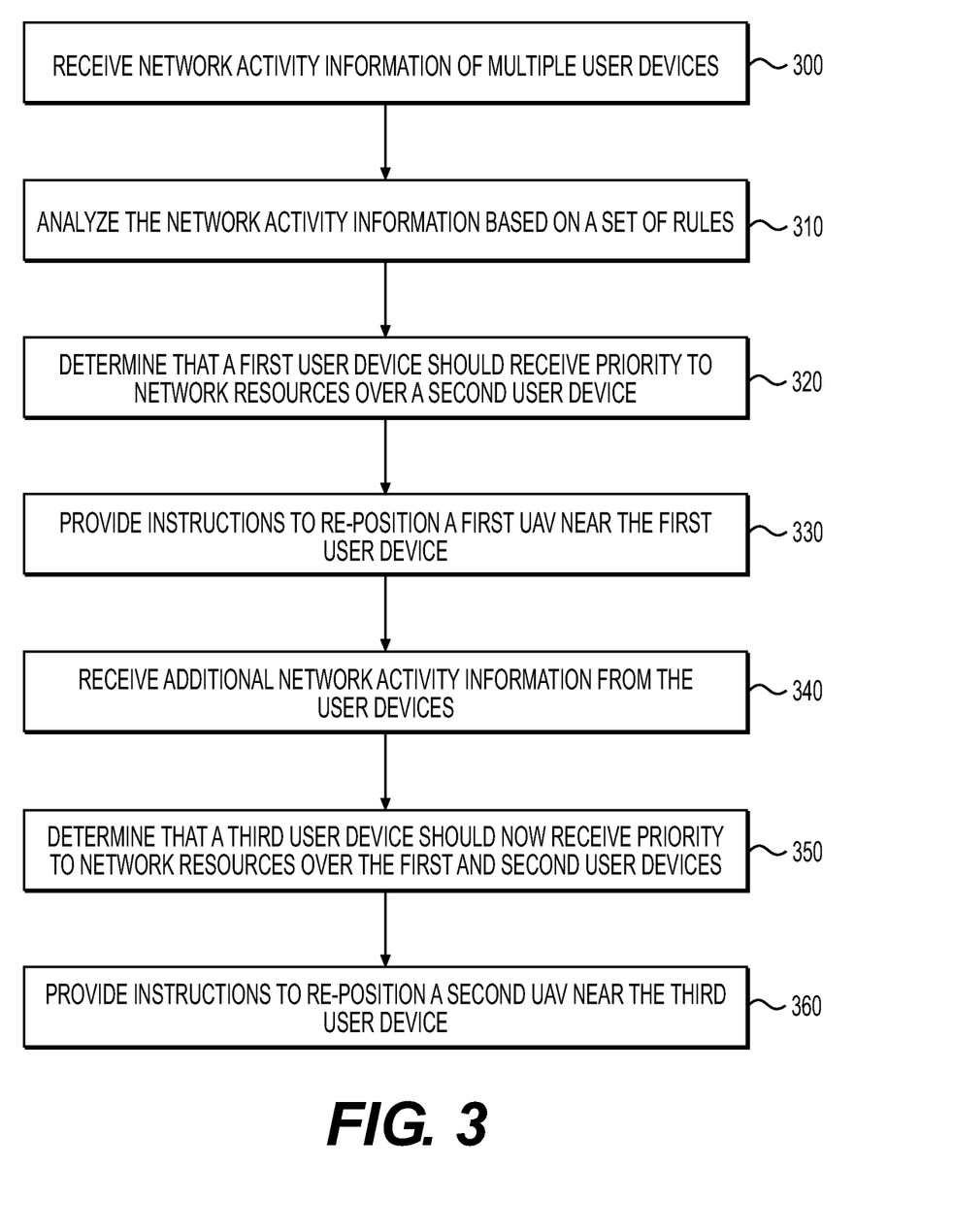
FIG. 3 is another flowchart of an example method for dynamically optimizing a FANET.

FIG. 3 is another flowchart of an example method for dynamically optimizing a FANET. At stage 300, server 110 can receive network activity information of multiple user devices 150, 160, 170. For example, server 110 can receive information from multiple user devices relating to those user devices' locations, network connection quality, and volume of UEM-related network traffic. In an example, the types of network activity collected can be set by an administrator. In another example, the network activity information can be gathered by the management application 180 installed on the user devices. Management application 180 can regularly send the network activity information to server 110.

At stage 310, server 110 can analyze the network activity information based on a set of rules. These rules can be designed to prioritize network stability and efficient network resource allocation of a FANET and the users' access to UEM resources. One example rule can prioritize network resources for certain users. For example, a rule can give priority to corporate officers and IT personnel in an enterprise organization. A second example rule can give priority to certain tasks. A third example rule can give priority based on UEM network traffic volume. An administrative console can allow an administrator of the UEM to select and prioritize the in an example.

At stage 320, server 110 can determine that first user device 150 should receive priority to network resources over second user device 160. This determination can be based on the analysis performed at stage 310, for example. In some examples, the rules for the priority determination can have a hierarchal structure. For example, the rules can have rankings relative to each other, and the rankings can determine when certain rules apply.

At stage 330, server 110 can provide instructions to reposition a UAV. The instructions can be sent to one or multiple UAVs 140 in FANET 130. The instructions can be based on the priority determination from stage 320. In some examples, server 110 can provide instructions to UAV 140 to follow a high priority user device. In other examples, factors unrelated to device priority can cause server 110 to send relocation instructions, such as UAV battery levels.

The server 110 can also ensure that UAVs 140 overlap in regions where a high priority user device is located. This can ensure that as one UAV 140 loses power or bandwidth, another UAV 140 is already present to maintain the high priority connection.

At stage 340, server 110 can receive additional network activity information from the user devices. Like stage 310 above, the network activity information can relate to the locations, network connection quality, and the volume and type of UEM-related traffic of multiple user devices. At stage 350, server 110 can determine that third user device 170 should receive priority over first user device 150 and second user device 160.

At stage 360, server 110 can provide instructions to a UAV 140 to reposition itself near third user device 170. In an example, these instructions can be based on a determination that third user device 170 should receive priority over first user device 150, second user device 160, or both. For example, upon receiving the additional network activity information, server 110 can analyze the information using the previously described set of rules.

In some examples, the priority change can be due to a change in circumstances. For example, third user device 170 may not have been located within the network area of FANET 130 but connected to FANET 130 afterward. The introduction of third user device 170 to FANET 130 can change how the user devices are prioritized where third user device 170 belongs to a user with a higher priority than first user device 150 or second user device 160. In another example, third user device 170 can receive a higher priority if it begins executing a network task that has been designated as a priority task. In another example, third user device 170 can receive a higher priority if it increases its network traffic to be greater than second user device 160.

The instructions by server 110 to UAV 140 can depend on the device priority change. For example, where third user device 170 receives a higher priority than first user device 150, server 110 can instruct at least one UAV 140 to move to a location near third user device 170. In some examples, this can include sending the UAV 140 positioned near first device 150 to reposition itself near third user device 170. In an example where first user device 150 and third user device 170 are located within broadcast range of a single UAV 140, server 110 can instruct the UAV 140 to position itself where both user devices can connect to it but closer to third user device 170 so that third user device 170 has a stronger connection.

For a very high priority device 150, the server 110 can instruct a UAV 140 to follow the device 150. This can allow a user to move freely around large acreage, such as on an all-terrain vehicle, while still maintaining connectivity with the UEM system. The very high priority can be based on the user's group, such as an executive group, in an example.

In some examples, third user device 170 can receive a higher priority than second user device 160, but still a lower priority than first user device 150. In such examples, server 110 can leave the UAV 140 positioned in stage 330 where it is and send instructions to a second UAV 140 to reposition itself near third user device 170.

Where two user devices are proximately located to each other (e.g., where two user devices are close enough to connect to the same UAV 140), server 110 can group such user devices together for determining user device priority. As an example, first user device 150 can be utilizing more UEM-related network traffic than either second user device 160 or third user device 170. However, second user device 160 or third user device 170 are proximately located to each other and together are utilizing more UEM-related network traffic than first user device 150. In such an example, server 110 can send instructions to reposition UAVs 140 to prioritize the network connections of second user device 160 and third user device 170 rather than first user device 150.

In some examples, server 110 can continuously receive network activity information from user devices, analyze the network activity to determine device priorities, and provide instructions to UAVs to reposition themselves according to the priority determinations. Each analysis and UAV repositioning reoptimizes FANET 130 for UEM purposes. The ability of server 110 to continuously analyze and reoptimize the FANET 130 illustrates how server 110 is configured to dynamically optimize FANET 130.

Additionally, the server 110 can change the overall number of UAVs 140 deployed based on the user devices' proximity to one another and total bandwidth demand on the FANET 130. Unused UAVs 140 can return to charger so that they are ready for redeployment when demands change on the FANET 130.

Figure 4:
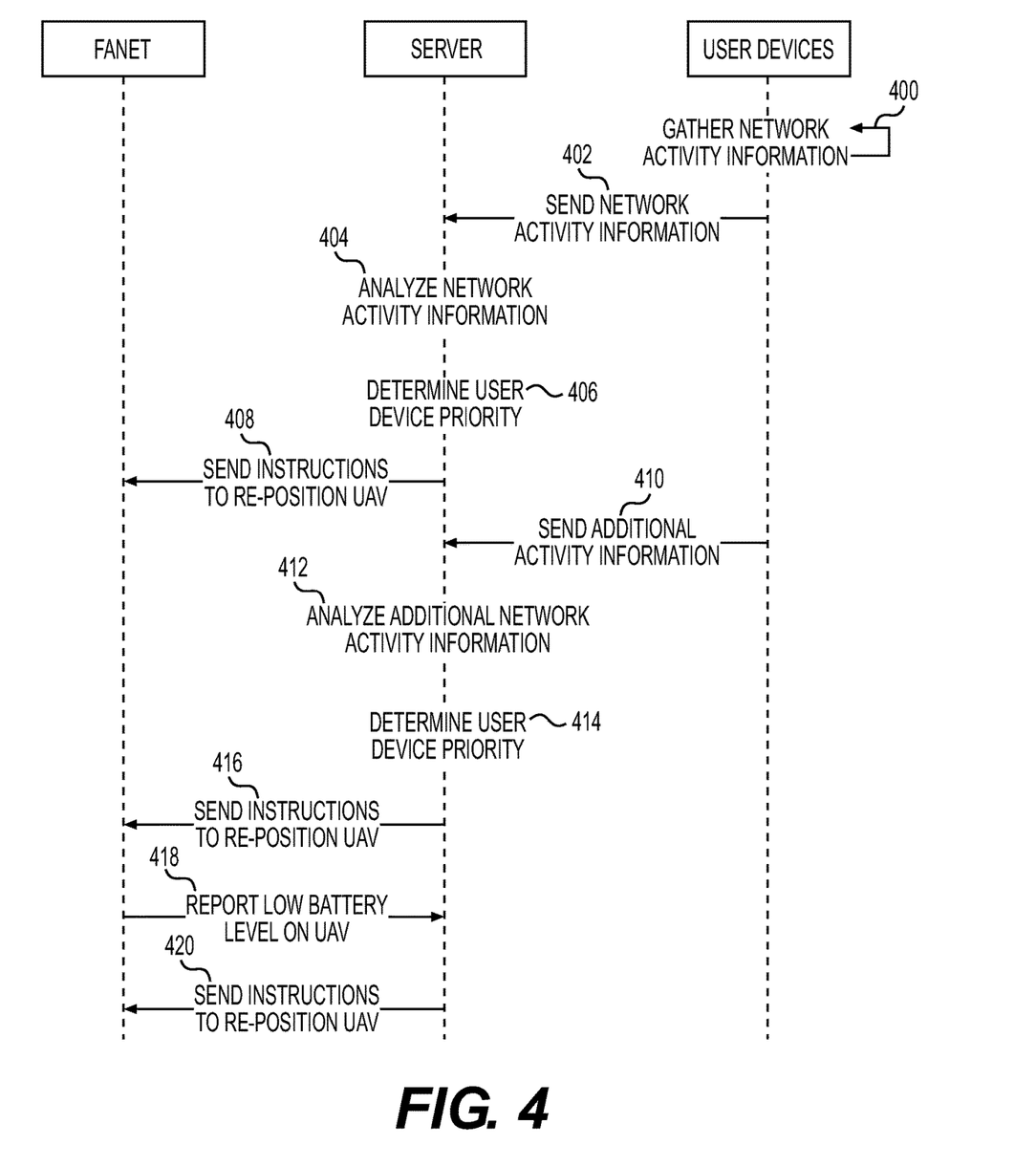
FIG. 4 is a sequence diagram of an example method for dynamically optimizing a FANET.

FIG. 4 is a sequence diagram of an example method for dynamically optimizing a FANET. At stage 400, user devices connected to FANET 130 gather network activity information. The user devices can be, for example, user devices 150, 160, and 170. The network activity information can be gathered by management application 180 installed on the user devices. For example, management application 180 can gather information about the user devices' locations, network connection quality, and volume of UEM-related network traffic. In an example, management application 180 can continuously gather the network activity information. In some examples, some or all the network activity information can be gathered by UAVs 140 to which the user devices are connected.

At stage 402, the user devices send the network activity information to server 110. For example, management application 180 can be configured to regularly instruct the user device to send the network activity information to server 110. At stage 404, server 110 can receive and analyze the network activity information based on a set of rules. These rules can be designed to prioritize network stability and efficient network resource allocation of a FANET and the users' access to UEM resources. One example rule can prioritize network resources for certain users. For example, a rule can give priority to corporate officers and IT personnel in an enterprise organization. A second example rule can give priority to certain tasks. A third example rule can give priority based on UEM network traffic volume.

At stage 406, server 110 can determine a priority of the user devices connected to FANET 130. For example, based on the analysis performed at stage 404, server 110 can determine that first user device 150 should receive highest priority, second user device 160 should receive second priority, and third user device 170 should receive lowest priority. As an example, first user device 150 can receive highest priority because it belongs to a priority user. Second user device 160 can receive second priority because it is performing a priority task but does not belong to a priority user. Third user device 170 can receive the lowest priority because it neither belongs to a priority user nor is performing a priority task.

At stage 408, server 110 can send instructions to reposition a UAV 140. Server 110 can send instructions to one or multiple UAVs 140. In some examples, the instructions from server 110 can indicate that UAVs 140 should remain where they are. In one example, server 110 may send instructions to UAVs 140 in circumstances where the UAVs 140 should move. For example, server 110 can send instructions when a high priority device reports weak signal strength, when a new user device connects to FANET 130, or when the priority of the user devices connected to FANET 130 change. The server 110 can also instruct a UAV 140 to maintain a proximity to a high priority user device, allowing the UAV 140 to follow that user device as the user moves. For example, an application executing on the UAV 140 can receive position information from the user device and continue tracking that user device without constant server 110 intervention.

In an example, user devices 150, 160, and 170 are connected to FANET 130 with highest, second, and lower priority respectively. Where first user device 150 reports poor connection quality to the UAV 140 to which it is connected, server 110 can instruct that UAV 140 to reposition itself so that first user device 150 can obtain a better connection. Server 110 can also deploy an additional UAV 140 with instructions to position itself near first user device 150. Repositioning one UAV 140 can affect the connection strengths of second user device 160 and third user device 170. Accordingly, server 110 can also instruction additional UAVs 140 to reposition themselves in such a way that prioritizes the connection strength of second user device 160 over third user device 170. Server 110 can thus reposition UAVs 140 in FANET 130 to optimize FANET 130 such that the highest priority user devices have the best available connection.

Stages 410, 412, 414, and 416 are substantially similar to stages 402, 404, 406, and 408 respectively. The user devices can send additional network activity information that is then analyzed by server 110 to again determine user device priority. If a change in user device priority has occurred, or, as previously described above, the signal quality or strength of a high priority device begins to drop, server 110 can instruct one or multiple UAVs 140 to reposition themselves to reoptimize FANET 130.

In one example, a new high priority user device can connect to FANET 130, and server 110 can deploy a new UAV 140 with the follow-me protocol previously described herein so that the UAV 140 follows the new user device. In another example, a user device can disconnect from, or move outside the range of, FANET 130, thus eliminating the need to provide a UAV 140 within range for that user device. Server 110 can then reposition the UAVs to optimize FANET 130 for the remaining user devices.

In another example, a user device can begin executing a priority task, thus changing the device priorities. As an example, user devices 150, 160, and 170 can have a highest, middle, and lowest priority respectively. Third user device 170 can begin executing a priority task that causes its priority level to be raised above, or in some cases to the same level, as second user device 160. Server 110 can send instructions to UAVs 140 to reposition themselves to reflect the new priority of third user device 170.

In some examples, server 110 can reposition a UAV 140 based on a calendar event or scheduled task of a user device. For example, server 110 can have access to the calendar or schedule of tasks of user devices connected to the FANET 130. Where a user device has a scheduled meeting or a priority task, as a few examples, server 110 can change the priority of the user device for the duration of the scheduled task or meeting. In some examples, server 110 can deploy a UAV 140 near the user device for the duration of the scheduled task or meeting.

At stage 418, a UAV 140 can report to server 110 that its battery level is low. In some examples, UAVs 140 can be configured to report low battery levels when the battery level drops below a threshold level. The threshold level can depend on the location of UAV 140, such as the distance from a charging station. At stage 420, server 110 can send instructions to reposition UAVs 140 based on the low batter level. For example, where a first UAV 140 reports a low battery level, server 110 can deploy a second UAV 140 so that it can arrive near the location of the first UAV 140 with enough time for the two UAVs 140 to hand off any user device connections and the first UAV 140 to safely return to a charging station.

Figure 5:
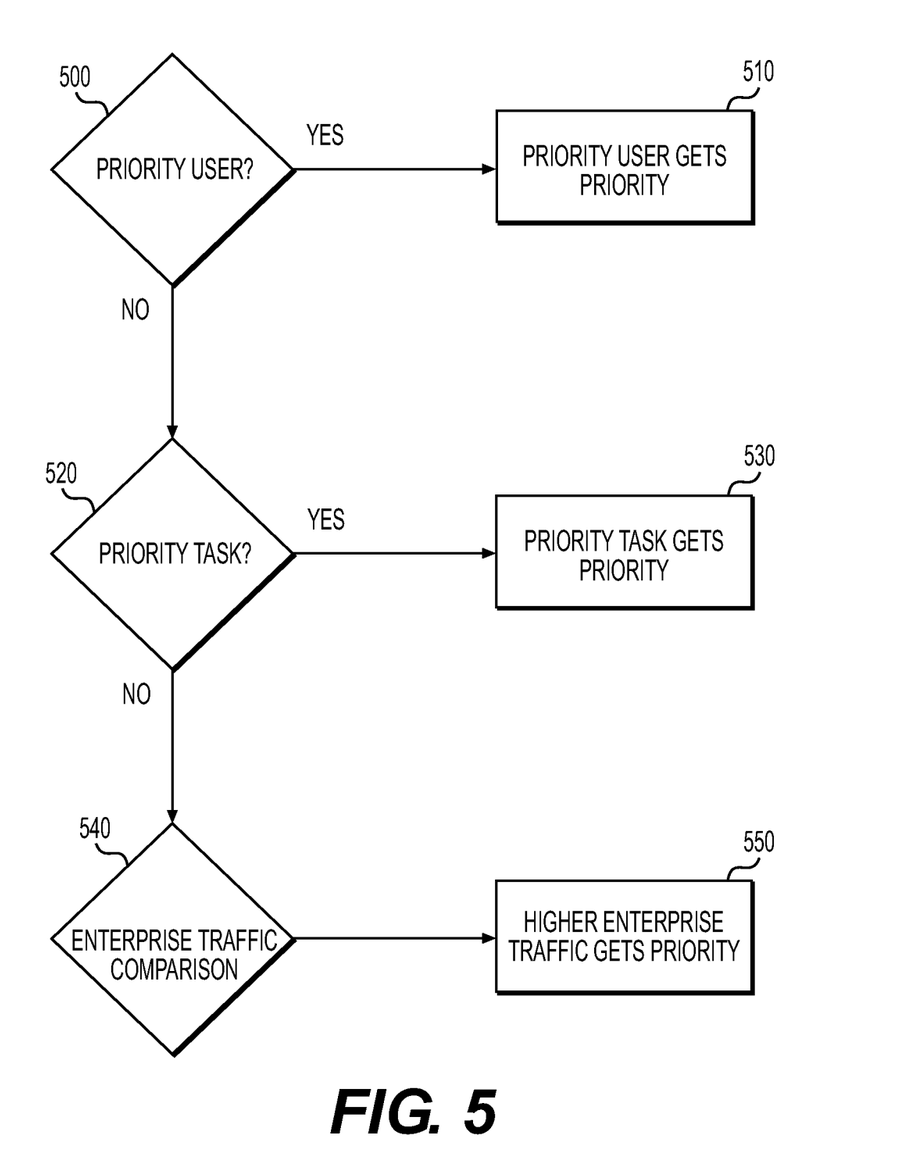
FIG. 5 is a flowchart of an example user device priority analysis.

FIG. 5 is a flowchart that illustrates a user device priority analysis. At stage 400, server 110 can whether a user device belongs to a priority user. If yes, then at stage 510 server 110 can give priority to the user device. Server 110 can then move to stage 520 where it determines if the user device is performing a priority task. If yes, then at stage 530 the user device receives priority. Server 110 can then move to stage 540 where it compares the volume of UEM-related network traffic of the user devices. At stage 550, server 110 can give priority to user devices utilizing the most UEM-related traffic.

In some examples, these rules can be given a hierarchy. For example, a user device belonging to a priority user can receive priority over other devices despite the tasks they are performing or their UEM traffic volume. Likewise, a user device performing a priority task can receive priority over another user device with higher UEM traffic volume. The hierarchy can also help differentiate user devices with a shared priority. For example, where two user devices connected to FANET 130 belong to priority users, server 110 can grant priority to the user device performing a priority task. Where both or neither user device is performing a priority task, priority can be given to the user device with the higher UEM traffic volume. Similarly, where two non-priority user devices are performing a priority task, priority can be given to the user device utilizing higher UEM network traffic.

In another example, stages 500, 520, and 540 are weighted based on inputs at an administrator console. The stages 500, 520, 540 assign a summed priority ranking to each user device. The user device with the highest summed priority then receives top prioritization.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for dynamically optimizing a flying ad-hoc network ("FANET"), comprising:
   receiving location information of first and second user devices that connect to a unified endpoint management ("UEM") system via the FANET;
   determining that the first user device should receive priority to network resources over the second user device; and
   providing instructions to re-position at least one unmanned aerial vehicle ("UAV") in the FANET based on the priority determination and the location information.

2. The method of claim 1, wherein the determining includes analyzing the network activity information of the first and second user devices based on a set of rules.

3. The method of claim 2, wherein the network activity information indicates a volume and type of network traffic utilized by the first and second user devices, the network traffic type indicating whether the network traffic is dedicated to UEM-related activities.

4. The method of claim 1, wherein the priority determination comprises at least one selected from the group of:
   prioritizing user devices utilizing a greater amount of network resources dedicated to UEM-related activities;
   prioritizing user devices based on a task being performed, wherein certain tasks are given priority over others; and
   prioritizing user devices associated with certain users.

5. The method of claim 1, wherein the location information is collected by a management application installed on the user devices.

6. The method of claim 1, wherein the priority determination is based on a calendar event that applies to the first user device and not the second user device.

7. The method of claim 1, wherein the priority determination includes determining that the first user device and a third user device can be served by a first UAV from a first location, wherein the repositioning includes moving the first UAV to the first location.

8. A non-transitory, computer-readable medium containing instructions that, when executed by a hardware-based processor, performs stages for dynamically optimizing a flying ad-hoc network ("FANET"), the stages comprising:
   receiving location information of first and second user devices that connect to a unified endpoint management ("UEM") system via the FANET;
   determining that the first user device should receive priority to network resources over the second user device; and
   providing instructions to re-position at least one unmanned aerial vehicle ("UAV") in the FANET based on the priority determination and the location information.

9. The non-transitory, computer-readable medium of claim 8, wherein the determining includes analyzing the network activity information of the first and second user devices based on a set of rules.

10. The non-transitory, computer-readable medium of claim 9, wherein the network activity information indicates a volume and type of network traffic utilized by the first and second user devices, the network traffic type indicating whether the network traffic is dedicated to UEM-related activities.

11. The non-transitory, computer-readable medium of claim 8, wherein the priority determination comprises at least one selected from the group of:
    prioritizing user devices utilizing a greater amount of network resources dedicated to UEM-related activities;
    prioritizing user devices based on a task being performed, wherein certain tasks are given priority over others; and
    prioritizing user devices associated with certain users.

12. The non-transitory, computer-readable medium of claim 8, wherein the location information is collected by a management application installed on the user devices.

13. The non-transitory, computer-readable medium of claim 8, wherein the priority determination is based on a calendar event that applies to the first user device and not the second user device.

14. The non-transitory, computer-readable medium of claim 8, wherein the priority determination includes determining that the first user device and a third user device can be served by a first UAV from a first location, wherein the repositioning includes moving the first UAV to the first location.

15. A system for dynamically optimizing a flying ad-hoc network ("FANET"), comprising:
- a memory storage including a non-transitory, computer-readable medium comprising instructions; and
- a computing device including a hardware-based processor that executes the instructions to carry out stages comprising:
  - receiving location information of first and second user devices that connect to a unified endpoint management ("UEM") system via the FANET;
  - determining that the first user device should receive priority to network resources over the second user device; and
  - providing instructions to re-position at least one unmanned aerial vehicle ("UAV") in the FANET based on the priority determination and the location information.

16. The system of claim 15, wherein the determining includes analyzing the network activity information of the first and second user devices based on a set of rules.

17. The system of claim 16, wherein the network activity information indicates a volume and type of network traffic utilized by the first and second user devices, the network traffic type indicating whether the network traffic is dedicated to UEM-related activities.

18. The system of claim 15, wherein the priority determination comprises at least one selected from the group of:
- prioritizing user devices utilizing a greater amount of network resources dedicated to UEM-related activities;
- prioritizing user devices based on a task being performed, wherein certain tasks are given priority over others; and
- prioritizing user devices associated with certain users.

19. The system of claim 15, wherein the location information is collected by a management application installed on the user devices.

20. The system of claim 15, wherein the priority determination includes determining that the first user device and a third user device can be served by a first UAV from a first location, wherein the repositioning includes moving the first UAV to the first location.

* * * * *